(12) United States Patent
Harris

(10) Patent No.: US 6,459,420 B1
(45) Date of Patent: Oct. 1, 2002

(54) ERGONOMICAL JOYSTICK DESIGN OR ATTACHMENT

(76) Inventor: Curtis James Harris, 14701 Seneca Rd., Darnestown, MD (US) 20874

( * ) Notice: Subject to any disclaimer, the term of this patent is extended or adjusted under 35 U.S.C. 154(b) by 195 days.

(21) Appl. No.: 09/604,293

(22) Filed: Jun. 26, 2000

(51) Int. Cl.$^7$ .................................................. G09G 5/00
(52) U.S. Cl. .......................... 345/161; 345/156; 463/38; 74/471 XY; D14/416
(58) Field of Search ................................. 345/156–169; 463/37–38; 273/148 B; D14/412–416; 200/5 A, 6 A, 5 R; 74/471 XY

(56) References Cited

U.S. PATENT DOCUMENTS

| | | | | |
|---|---|---|---|---|
| 4,739,128 A | * | 4/1988 | Grisham ..................... 200/6 A |
| 5,559,432 A | * | 9/1996 | Logue ..................... 74/471 XY |
| 6,102,803 A | * | 8/2000 | Takeda et al. ................. 463/38 |
| 6,201,196 B1 | * | 3/2001 | Wergen ....................... 200/6 A |
| 6,266,046 B1 | * | 7/2001 | Arita ........................... 345/156 |
| 6,307,483 B1 | * | 10/2001 | Takeda et al. .............. 345/161 |
| 6,313,826 B1 | * | 11/2001 | Schrum et al. ............. 345/161 |
| 6,359,611 B2 | * | 3/2002 | Chan ........................... 345/156 |

* cited by examiner

*Primary Examiner*—Lun-Yi Lao

(57) ABSTRACT

A joystick design or a joystick attachment which is easier to use by a player by providing the benefit of reducing soreness in the thumb of the player and by providing better control by preventing a player's thumb from slipping from the joystick. The joystick design and attachment for a conventional joystick includes at least partial side and top portions which surround the players' thumb.

18 Claims, 2 Drawing Sheets

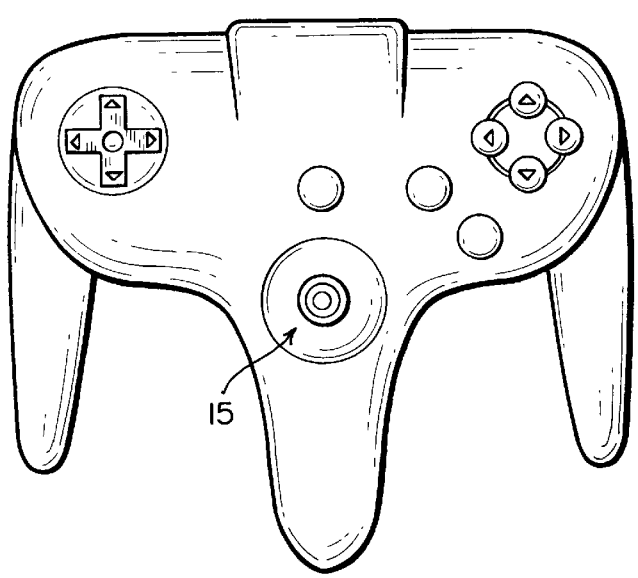
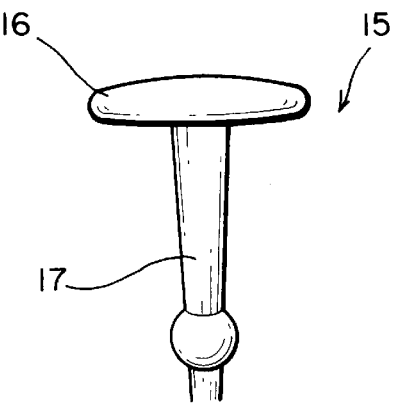
FIG. 1(a)
(PRIOR ART)
FIG. 1(b)
(PRIOR ART)
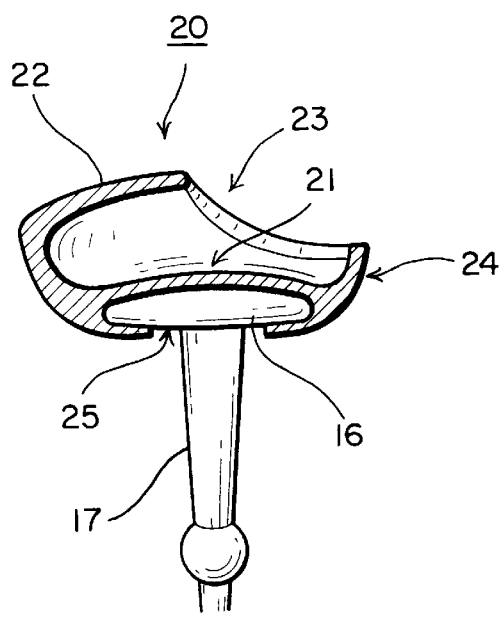
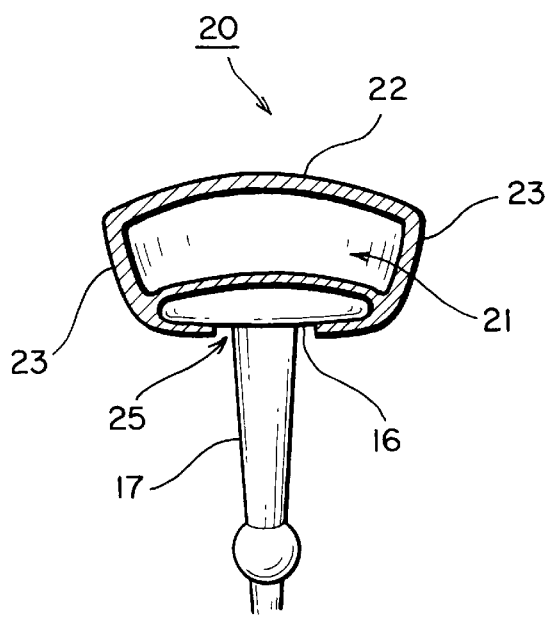
FIG. 2(a)
FIG. 2(b)

ERGONOMICAL JOYSTICK DESIGN OR ATTACHMENT

BACKGROUND OF THE INVENTION

1. Field of the Invention

The present invention is directed to a joystick design or an attachment to a joystick, which enhances usability and control of the joystick.

2. Discussion of the Background

Arcade games, computer games, video games, virtual reality games, etc., are all very popular. Such games include user controls to control an action in the game. Some of the most common forms of such games are the "Sony Playstation", "the Nintendo 64", the "Sega Dreamcast", etc. Those games utilize a hand-held controller with various controls to be manipulated by a player. An example of such a controller is shown in FIG. 1(a). As shown in FIG. 1(a), one common control element utilized in such games is a joystick 15. The joystick 15 is a control element manipulated by the thumb of a player and typically has a mushroom shape as shown in FIG. 1(b) including a stem 17 and a rounded top portion 16. The joystick 15 focuses on the hand/eye/thumb coordination of the player. The thumb therefore becomes a critical part in coordinating the precise movements of the joystick 15.

As noted above, and as shown in FIG. 1(b), the joystick 15 is typically formed in a mushroom shape with a rounded top portion 16 attached to a stem 17. During use of the joystick 15 a player's thumb contacts the rounded top portion 16 with significant pressure for extended periods of time during play. That extended pressure may in turn cause tenderness or soreness in the nerves of the thumb, which contact the rounded top portion 16.

Moreover, during use a thumb of a player is apt to slip off of the rounded top portion 16 which can cause unpleasant results on the part of the player with respect to the game the player is playing. Moreover, many games, including sports oriented games, are high paced and require extensive and rapid manipulation of the joystick 15 by the player's thumb, which only aggravates the soreness or tenderness which may result in the player's thumb and which only aggravates and increases the possibility of the player's thumb slipping-off of the rounded top portion 16 of the joystick 15.

SUMMARY OF THE INVENTION

Accordingly, one object of the present invention is to overcome the above-noted and other drawbacks in the background art.

A further more specific object of the present invention is to provide a joystick design or a joystick attachment which is easier to use by a player, by providing the benefit of reducing soreness in the thumb of the player and by providing better control by preventing a player's thumb from easily slipping off the joystick.

The present invention achieves the above and other objects by providing a novel joystick design and attachment for a conventional joystick which includes at least partial side, back and top portions which at least partially surround a players' thumb.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1(a) shows a conventional controller for a video game;

FIG. 1(b) shows the shape of a conventional joystick used in the controller of FIG. 1(a);

FIGS. 2(a) and 2(b) show a configuration of a joystick attachment of the present invention;

DESCRIPTION OF THE PREFERRED EMBODIMENTS

The present invention has been designed to enhance controllability and lessen soreness, fatigue, etc., when utilizing a joystick in, as an example, a video game. As noted above, a conventional joystick 15 of FIG. 1(b) has a rounded top portion 16 which requires the player's thumb to exert pressure thereon for extended times and which may require rapid and extended manipulations. The present invention as now discussed below can be applied to a controller for a video game such as shown in FIG. 1(a), but the present invention could also be applied to any controller which utilizes a joystick.

To address the drawbacks in the conventional joystick 15 of FIG. 1(a), the present invention provides either a novel integrated shape of a joystick or an attachment for the conventional joystick 15.

The benefits of utilizing the structure in the present invention as a joystick shape is simplicity in manufacture in that one joystick element can be made as a unitary element. However, the present invention can also be utilized as an attachment to a joystick so that existing joysticks could be retrofit to realize the benefits in the present invention.

FIGS. 2(a) and 2(b) show, respectively, a side view and a back view of the joystick attachment design of the present invention. That is, the present invention as shown in FIGS. 2(a) and 2(b) is an attachment to the conventional joystick 15; however, a joystick could be designed as a single unitary element with the shape as shown in FIGS. 2(a) and 2(b) if desired.

As shown in FIGS. 2(a) and 2(b), the present invention can be constructed as a joystick attachment 20 to be fitted onto the rounded top portion 16 of the conventional joystick 15. To this extent, the present invention as a joystick attachment 20 includes a hole 25 which is fitted over the rounded top portion 16 of the joystick 15 in a secure manner. That is, the joystick attachment 20 of the present invention includes a hole 25 which can fit over the rounded top portion 16 of the joystick 15 to be snugly attached thereto. That can be achieved by the joystick attachment 20 of the present invention being formed of a resilient member such as rubber, or by utilizing an adhesive (not shown) to secure the joystick attachment 20 to the rounded top portion 16 of the conventional joystick 15.

Figure 4A:
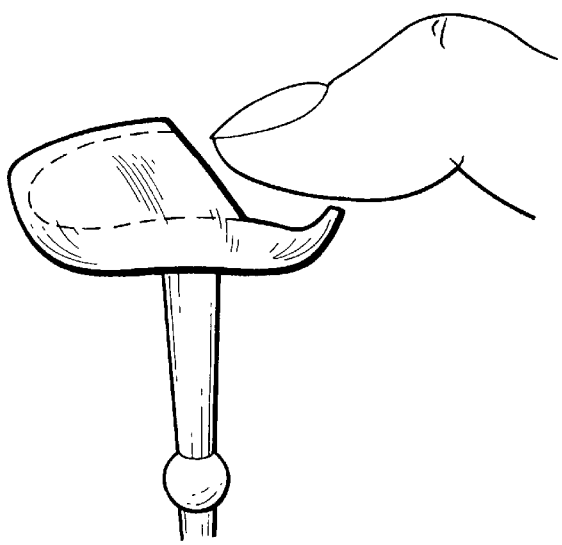
FIGS. 4(a) and 4(b) shows a joystick configuration of the present invention in use with a player's thumb.
Figure 4B:
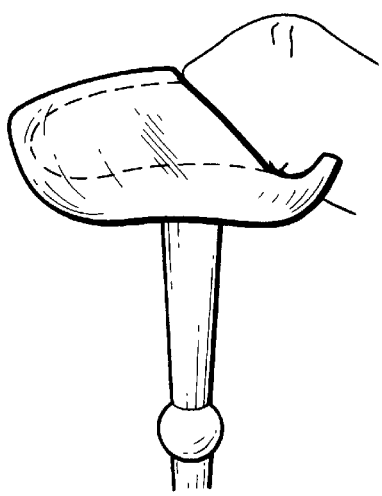

Further, the joystick attachment 20 of the present invention includes a groove portion 21 into which a thumb of a player is inserted, as shown in FIGS. 4(a) and 4(b). The groove portion 21 is formed by side walls 23 and, a back wall 24 a top wall 22 which at least partially surround the player's thumb when the player's thumb is inserted in the groove portion 21, as shown in FIGS. 4(a) and 4(b). The top portion 22, back wall 24 and side walls 23 can extend a distance up the player's thumb such that the player's thumb is securely held therein, similarly to "toe-clips" on a bicycle.

In such a way, the joystick attachment 20 in the present invention has a concave shape that supports the contours of a player's thumb. Of course the exact size and exact shape of the groove portion 21 can be modified as desired.

The benefits achieved by the joystick attachment 20 of the present invention are many and significant. First, as a player's thumb is surrounded on the sides, back side and top portions the players' thumb is more securely held onto the joystick. Thus, the player can impart rapid movements to the joystick in an easier manner than in a joystick with just the rounded top portion 16. Further, the tension points of the player's thumb on the joystick may be spread over the player's thumb so that no one portion of the player's thumb receives excessive soreness. Thus, the player's thumb becomes less fatigued and greater control is imparted to the joystick control, which may be significant in games, which require rapid joystick manipulation.

Further, the joystick attachment 20 of FIGS. 2(*a*) and 2(*b*) is an attachment which can be easily retrofit onto an existing conventional joystick 15 so that the many millions of video game controllers already in use can benefit from the advantages of the joystick attachment 20 of the present invention.

As noted above, FIGS. 2(*a*) and 2(*b*) disclose a joystick attachment 20, which is a separate element from the joystick 15. However, a joystick itself could be integrally designed with the shape as shown in FIGS. 2(*a*) and 2(*b*), as shown in FIGS. 3(*a*) and 3(*b*).

That is, if a manufacturer of the video game controller of FIG. 1(*a*) desires to sell the controller with the joystick shape of the present invention, the manufacturer of the video game controller FIG. 1(*a*) can provide the joystick attachment as shown in FIGS. 2(*a*) and 2(*b*) onto the joystick and can additionally secure that joystick attachment to the rounded top portion 16 of the joystick 15 by an adhesive (not shown), as one example. Alternatively, a joystick 30 itself could be formed as a unitary element such that the top portion of the joystick 30 itself includes the shape as shown in FIGS. 2(*a*) and 2(*b*). That additional structure of the joystick 30 is shown in FIGS. 3(*a*) and 3(*b*) in which the top portion including the sidewalls 23, back side 24 and the top portion 22 is formed as an integral top element of a stem 17 of a joystick 30. Either of such additional constructions are easily achievable in the present invention.

Figure 3A:
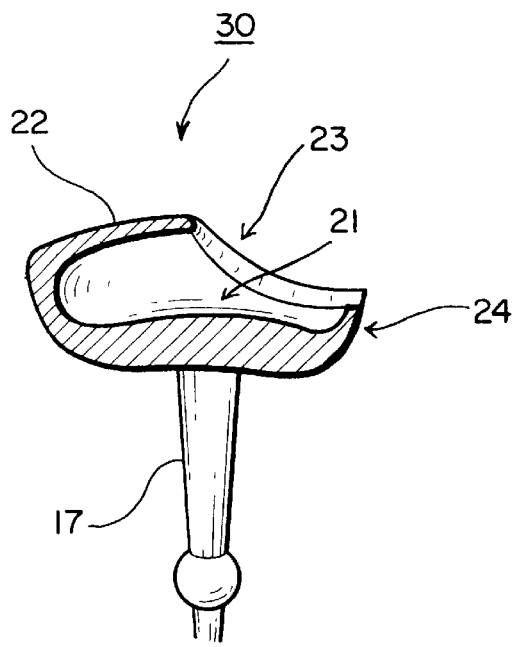
FIGS. 3(a) and 3(b) show a joystick configuration of the present invention.
Figure 3B:
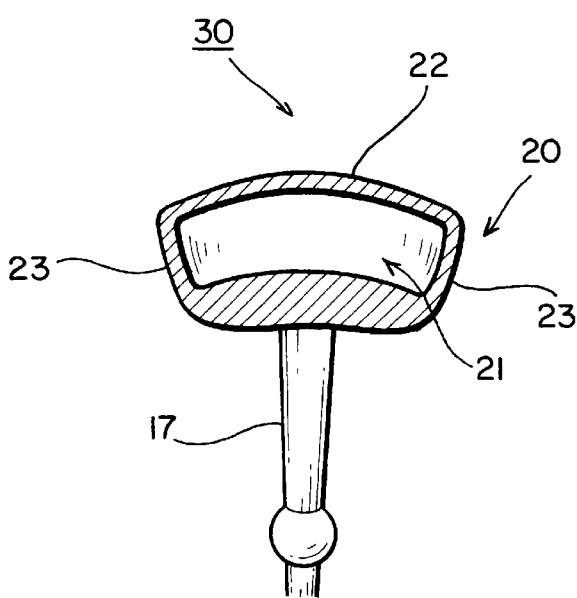

The joystick attachment 20 of FIGS. 2(*a*) and 2(*b*) or joystick top of FIGS. 3(*a*) and 3(*b*) can be formed of a rubber/latex material, or a plastic material, which can be easily made by a molding process. Further, as the joystick attachment 20 or joystick 30 top are formed of a flexible material such as rubber/latex, the joystick attachment 20 or joystick 30 top will be very comfortable to use even when surrounding a thumb of the player.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A joystick attachment comprising:

a hole configured for a player's thumb to securely fit over a top portion of the joystick; and a groove, formed by a pair of side walls, back wall and a top wall to cover a portion of the player's thumb, configured to receive the player's thumb of the joystick.

2. A joystick attachment according to claim 1, wherein said side walls, back wall and side top wall are formed of an elastic material.

3. A joystick attachment according to claim 1, wherein said side walls, said back wall and said top wall are formed of a plastic material.

4. A joystick attachment according to claim 1, wherein said side walls, said back wall and said top wall formed of a rubber material.

5. A joystick attachment according to claim 1, wherein said side walls, said back wall, and said top wall are formed of a latex material.

6. A joystick attachment according to claim 1, wherein said side walls, said back wall and said top wall are formed using polyvinylchloride.

7. A joystick comprising:

a stem;

top portion formed on the stem, the top portion including a groove, formed by a pair of side walls, a back wall and a top wall to cover a portion of a player's thumb, configured to receive the player's thumb of the joystick.

8. A joystick according to claim 7, wherein said side walls and side top wall are formed of an elastic material.

9. A joystick according to claim 7, wherein said side walls, said back wall and said top wall are formed of a plastic material.

10. A joystick according to claim 7, wherein said side walls, said back wall and said top wall are formed of a rubber material.

11. A joystick according to claim 7, wherein said side walls, said back wall, and said top wall are formed of a latex material.

12. A joystick according to claim 7, wherein said side walls, said back wall and said top wall are formed from polyvinylchloride.

13. A video game controller comprising:

a joystick including a stem and a top portion formed on the stem; and the top portion including a groove, formed by a pair of side walls, a back wall and a top portion, configured to receive the player's thumb of the joystick.

14. A video game controller according to claim 13, wherein said side walls, said back wall and said top wall are formed of an elastic material.

15. A video game controller according to claim 13, wherein said side walls, said back wall, and said top wall are formed of a plastic material.

16. A video game controller according to claim 13, wherein said side walls, said back wall, and said top wall are formed of a rubber material.

17. A video game controller according to claim 13, wherein said side walls, said back wall, and said top wall are formed of a latex material.

18. A video game controller according to claim 13, wherein said side walls, said back wall, and said top wall are formed from polyvinylchloride.

* * * * *